US009643440B2

(12) United States Patent
Nariai et al.

(10) Patent No.: US 9,643,440 B2
(45) Date of Patent: May 9, 2017

(54) INFORMATION PROCESSING DEVICE, PRINTING DEVICE, AND CONTROL METHOD OF AN INFORMATION PROCESSING DEVICE

(71) Applicant: Seiko Epson Corporation, Tokyo (JP)

(72) Inventors: Kenji Nariai, Shiojiri (JP); Makoto Noguchi, Shiojiri (JP); Toshiki Takei, Shiojiri (JP); Tsutomu Kasai, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 11 days.

(21) Appl. No.: 14/688,237

(22) Filed: Apr. 16, 2015

(65) Prior Publication Data
US 2015/0316953 A1 Nov. 5, 2015

(30) Foreign Application Priority Data

Apr. 30, 2014 (JP) ................................ 2014-093689
Mar. 5, 2015 (JP) ................................ 2015-043536

(51) Int. Cl.
| | | |
|---|---|---|
| *G06F 1/00* | (2006.01) | |
| *G06F 1/32* | (2006.01) | |
| *B41J 29/393* | (2006.01) | |
| *G06F 1/10* | (2006.01) | |
| *G06F 13/24* | (2006.01) | |

(Continued)

(52) U.S. Cl.
CPC .............. *B41J 29/393* (2013.01); *G06F 1/10* (2013.01); *G06F 1/32* (2013.01); *G06F 13/24* (2013.01); *G06K 15/00* (2013.01); *G06F 1/3203* (2013.01); *G06F 1/3243* (2013.01); *G06F 9/505* (2013.01); *G06F 9/5088* (2013.01); *G06F 9/5094* (2013.01); *Y02B 60/1228* (2013.01)

(58) Field of Classification Search
CPC .... G06F 1/3203; G06F 1/3243; G06F 9/5088; G06F 9/505
USPC ................................ 713/300, 320, 322, 323
See application file for complete search history.

(56) References Cited

U.S. PATENT DOCUMENTS

| | | | |
|---|---|---|---|
| 7,800,621 B2 * | 9/2010 | Fry ........................ | G06F 1/3225 345/520 |
| 2006/0143409 A1 * | 6/2006 | Merrell ................. | G06F 1/3203 711/146 |

(Continued)

FOREIGN PATENT DOCUMENTS

| | | |
|---|---|---|
| JP | 2007-047966 A | 2/2007 |
| JP | 2007-290258 A | 11/2007 |

(Continued)

*Primary Examiner* — Michael J Brown
(74) *Attorney, Agent, or Firm* — Foley & Lardner LLP

(57) ABSTRACT

Efficient power conservation is enabled using a configuration having multiple processors. A printing device has a first processor unit that runs a program stored in a first memory, and a second processor unit that runs a program stored in a second memory, and has operating modes including a normal mode in which the first processor unit and the second processor unit operate according to a normal clock, and a first power conservation mode in which, after going to a state enabling the first processor unit to execute some processes of the second processor unit, the first processor unit operates according to the normal clock, and the second processor operates according to a slow clock having an operating frequency lower than the normal clock.

19 Claims, 12 Drawing Sheets

(51) Int. Cl.
*G06K 15/00* (2006.01)
*G06F 9/50* (2006.01)

(56) References Cited

U.S. PATENT DOCUMENTS

| | | |
|---|---|---|
| 2007/0260753 A1 | 11/2007 | Komatsu et al. |
| 2010/0185833 A1* | 7/2010 | Saito .................... G06F 1/3203 712/203 |
| 2011/0216375 A1 | 9/2011 | Suzuki |

FOREIGN PATENT DOCUMENTS

| | | |
|---|---|---|
| JP | 2010-005911 A | 1/2010 |
| JP | 2011-186459 A | 9/2011 |
| JP | 2011-257906 A | 12/2011 |

* cited by examiner

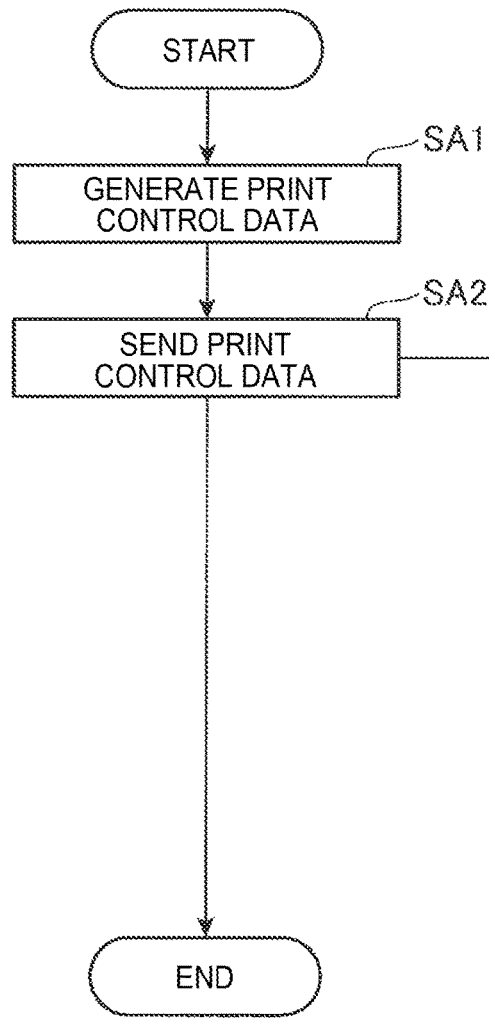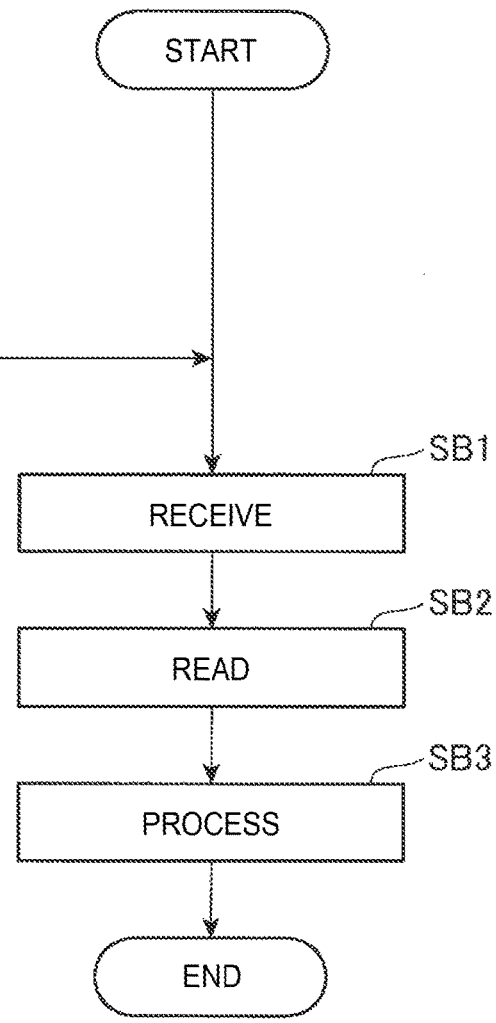

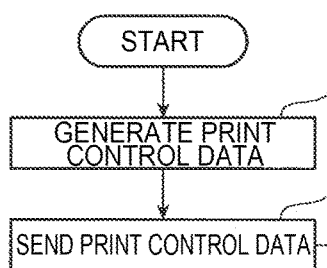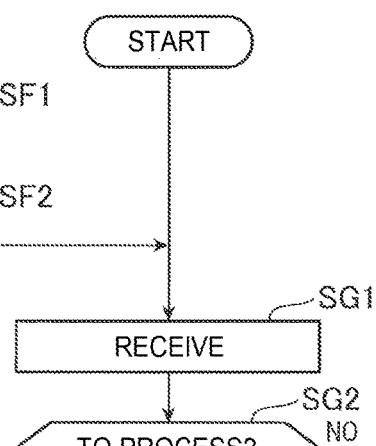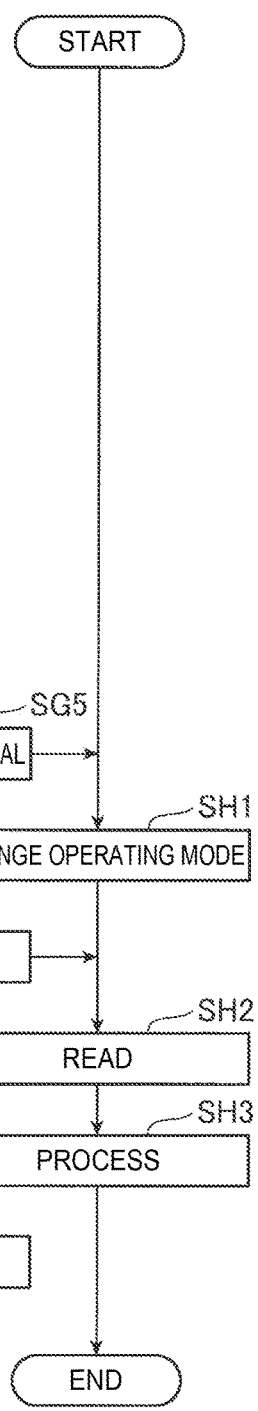

FIG. 10 (A) FIG. 10 (B) FIG. 10 (C)
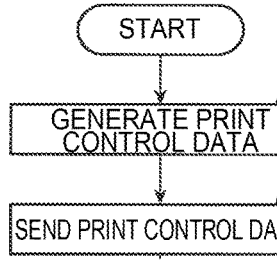
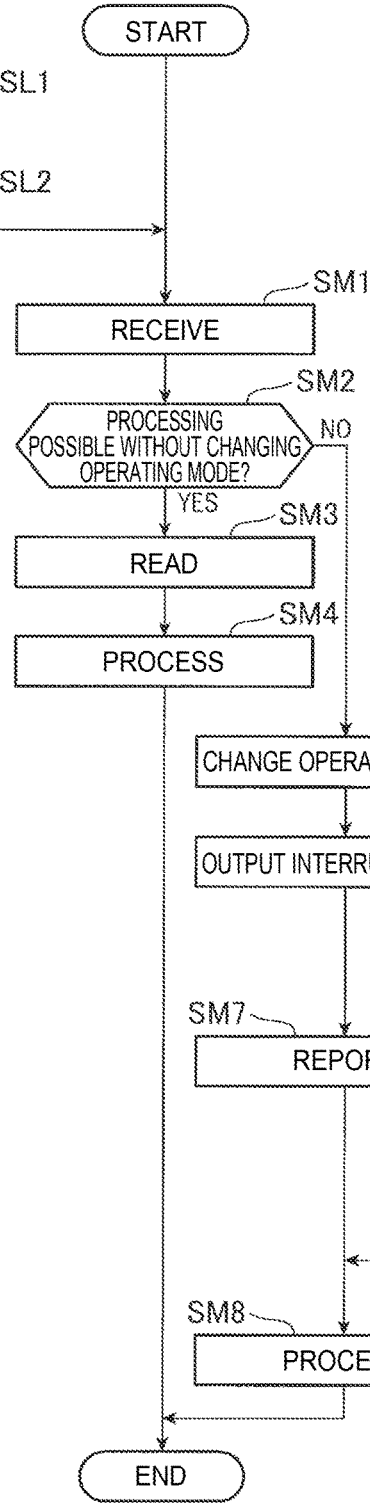
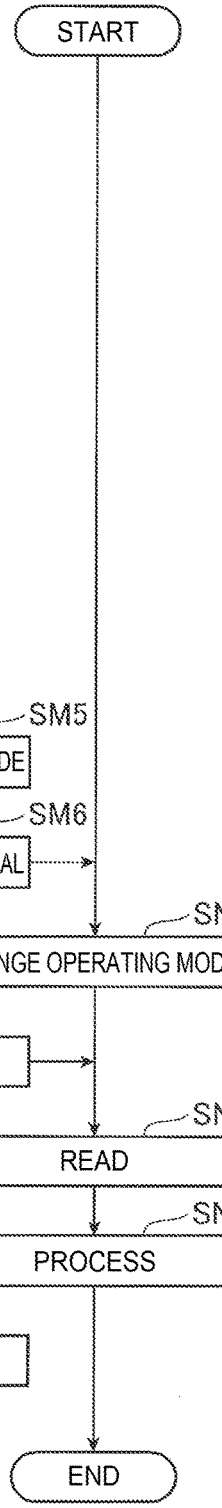

INFORMATION PROCESSING DEVICE, PRINTING DEVICE, AND CONTROL METHOD OF AN INFORMATION PROCESSING DEVICE

Priority is claimed under 35 U.S.C. §119 on Japanese patent application nos. JP 2014-093689 and JP 2015-043536, filed Apr. 30, 2014 and Mar. 5, 2015, respectively. These priority applications are hereby incorporated by reference in their entirety.

BACKGROUND

1. Technical Field

The present disclosure relates to an information processing device, a printing device, and a control method of an information processing device.

2. Related Art

Information processing devices that have a master CPU and a slave CPU, and set the operating conditions of the slave CPU in a power conservation mode are known from the literature. See, for example, JP-A-2007-290258.

There is a need to achieve efficient power conservation by using the configuration of plural processors in devices such as the foregoing information processing device that have plural processors (CPUs).

SUMMARY

An objective of the present invention is therefore to achieve efficient power conservation using a configuration having plural processors.

To achieve the foregoing objective, an information processing device according to the invention includes: a first processor that runs a program stored in a first memory; and a second processor that runs a program stored in a second memory. The device has a first operating mode in which the first processor and the second processor operate according to a first clock, and a second operating mode in which the first processor executes some functions of the second processor, the first processor operates according to the first clock, and the second processor operates according to a second clock having an operating frequency lower than the first clock.

This aspect of the invention enables efficient power conservation using a configuration having multiple processors.

In an information processing device according to another aspect of the invention, the second memory executes a refresh operation in the first operating mode, and operates in a self-refresh mode in the second operating mode.

This aspect of the invention enables efficient power conservation using a configuration having multiple processors.

In an information processing device according to another aspect of the invention, the second processor goes to a wait-for-interrupt state in the second operating mode.

This aspect of the invention enables efficient power conservation using a configuration having multiple processors.

In an information processing device according to another aspect of the invention, the device has a third operating mode in which the first processor and the second processor operate according to the second clock.

This aspect of the invention enables efficient power conservation using a configuration having multiple processors.

In an information processing device according to another aspect of the invention, the device has a fourth operating mode in which the first processor operates according to the second clock in a wait-for-interrupt state, and the second processor operates according to the second clock.

This aspect of the invention enables efficient power conservation using a configuration having multiple processors.

In an information processing device according to another aspect of the invention, the first processor runs a program stored in the first memory and executes a process related to controlling itself; the second processor runs a program stored in the second memory and executes a process related to communicating with an external device; and the first processor executes some of the processes related to communication with the external device in the second operating mode.

This aspect of the invention enables efficient power conservation using a configuration having multiple processors.

Another aspect of the invention is a printing device including: a print unit that prints; a first communication interface and a second communication interface; a control unit including a first processor that runs a program related to control of the print unit, a second processor that runs a program related to control of the second communication interface, and first memory that stores a program related to control of the print unit; and second memory storing a program related to control of the second communication interface; the control unit having a first operating mode in which the first processor and the second processor operate according to a first clock, and a second operating mode in which the first processor executes some functions of the second processor, the first processor operates according to the first clock, and the second processor operates according to a second clock having an operating frequency lower than the first clock.

This aspect of the invention enables efficient power conservation using a configuration having multiple processors.

In a printing device according to another aspect of the invention, the second memory executes a refresh operation in the first operating mode, and operates in a self-refresh mode in the second operating mode.

This aspect of the invention enables efficient power conservation using a configuration having multiple processors.

In a printing device according to another aspect of the invention, the second processor goes to a wait-for-interrupt state in the second operating mode.

This aspect of the invention enables efficient power conservation using a configuration having multiple processors.

In a printing device according to another aspect of the invention, the control unit has a third operating mode in which the first processor and the second processor operate according to the second clock.

This aspect of the invention enables efficient power conservation using a configuration having multiple processors.

In a printing device according to another aspect of the invention, the control unit has a fourth operating mode in which the first processor operates according to the second clock in a wait-for-interrupt state, and the second processor operates according to the second clock.

This aspect of the invention enables efficient power conservation using a configuration having multiple processors.

In a printing device according to another aspect of the invention, when data received in the second operating mode by the second communication interface includes print control data, the second processor goes to the first operating mode based on a report from the first processor and executes a process related to receiving the print control data, and the first processor controls the print unit to print based on the print control data received by the second processor.

This aspect of the invention enables efficient power conservation using a configuration having multiple processors.

In a printing device according to another aspect of the invention, when the data the second communication interface received in the third operating mode contains print control data, the first processor goes to the second operating mode and reports to the second processor, the second processor goes to the first operating mode based on the report from the first processor and executes a process to receive the print control data, and the first processor prints by the print unit based on the print control data received by the second processor.

This aspect of the invention enables efficient power conservation using a configuration having multiple processors.

Another aspect of the invention is a control method of an information processing device including a first processor that runs a program stored in a first memory, and a second processor that runs a program stored in a second memory, the method including: when a specific condition is satisfied, changing from a first operating mode in which the first processor and the second processor operate according to a first clock, to a second operating mode in which the first processor executes some functions of the second processor, the first processor operates according to the first clock, and the second processor operates according to a second clock having an operating frequency lower than the first clock.

This aspect of the invention enables efficient power conservation using a configuration having multiple processors.

In a control method of an information processing device according to another aspect of the invention, the second memory executes a refresh operation in the first operating mode, and operates in a self-refresh mode in the second operating mode.

This aspect of the invention enables efficient power conservation using a configuration having multiple processors.

In a control method of an information processing device according to another aspect of the invention, the second processor goes to a wait-for-interrupt state in the second operating mode.

This aspect of the invention enables efficient power conservation using a configuration having multiple processors.

A control method of an information processing device according to another aspect of the invention also includes changing from the second operating mode to a third operating mode in which the first processor and the second processor operate according to the second clock when a specific condition is satisfied.

This aspect of the invention enables efficient power conservation using a configuration having multiple processors.

A control method of an information processing device according to another aspect of the invention also includes changing from the second operating mode to a fourth operating mode in which the first processor operates according to the second clock in a wait-for-interrupt state, and the second processor operates according to the second clock.

This aspect of the invention enables efficient power conservation using a configuration having multiple processors.

A control method of an information processing device according to another aspect of the invention also includes the first processor running a program stored in the first memory and executing a process related to controlling printing; the second processor running a program stored in the second memory and executing a process related to communication; and the first processor executing some processes related to communication in the second operating mode.

This aspect of the invention enables efficient power conservation using a configuration having multiple processors.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 4(A) and 4(B) are flow charts describing the operation of a host computer and the printing device in the normal operating mode.

FIGS. 7(A), 7(B) and 7(C) are flow charts describing the operation of a host computer and the printing device in the first power conservation mode.

FIGS. 10(A), 10(B) and 10(C) are flow charts describing the operation of a host computer and the printing device in the second power conservation mode.

DESCRIPTION OF EMBODIMENTS

Some embodiments of the present invention are described below with reference to the accompanying figures.

Figure 1:
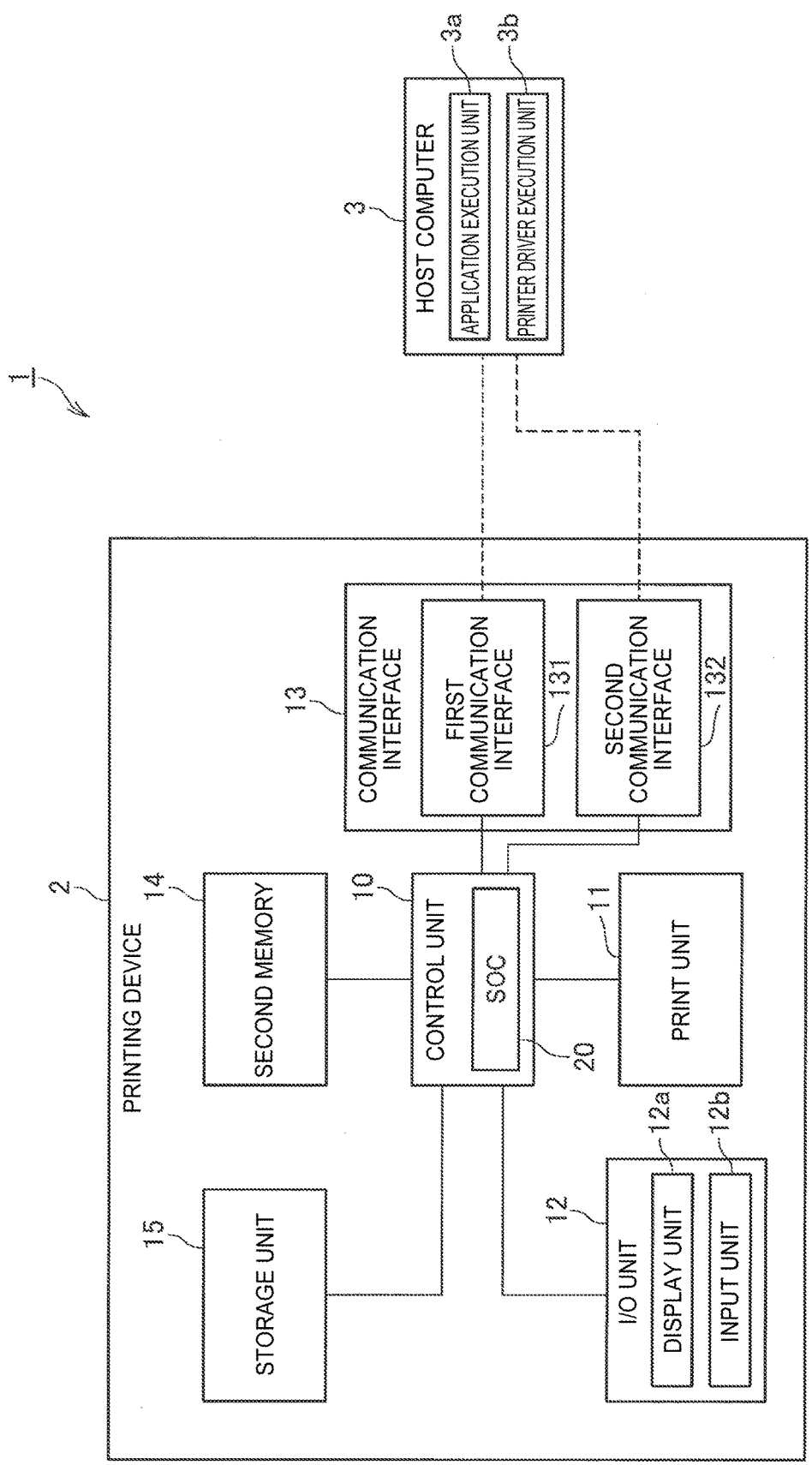
FIG. 1 is a block diagram illustrating the configuration of a printing system according to the invention.

FIG. 1 is a block diagram illustrating the functional configuration of a printing system 1 according to the invention.

As shown in FIG. 1, the printing system 1 includes a printing device 2 (information processing device) and a host computer 3 (external device) that communicates with the printing device 2 and controls the printing device 2.

As shown in FIG. 1, the host computer 3 has an application execution unit 3a that executes processes by reading and running an installed application, and a printer driver execution unit 3b that executes processes by reading and running an installed printer driver. The application is software with a function for outputting information about images to be printed by the printing device 2, such as a word processor program, a spreadsheet program, a web browser, or a POS application.

The application execution unit 3a generates information about the images to be printed by the printing device 2 when triggered by a command from the user, for example, and outputs to the printer driver execution unit 3b using an API, for example. The printer driver execution unit 3b generates print control data in a command language that can be interpreted by the printing device 2 based on the input image information. The host computer 3 sends the print control data generated by the printer driver execution unit 3b to the printing device 2.

The printing device 2 prints images on the recording medium based on the print control data received from the host computer 3.

As shown in FIG. 1, the printing device 2 includes a control unit 10, print unit 11, I/O unit 12, communication interface 13, second memory 14, and storage unit 15.

The control unit 10 includes a SOC (system-on-a-chip) 20, and controls the printing device 2 by functions of the first processor unit 21 (first processor) and second processor unit 22 (second processor) included in the SOC 20. The SOC 20 is described further below.

The print unit 11 includes a print mechanism with a printhead, a conveyance mechanism that conveys the recording medium, and other mechanisms related to printing, and prints on the recording medium as controlled by the control unit 10. The control unit 10 controls the print unit 11 based on the print control data received from the host computer 3.

The I/O unit 12 includes a display unit 12a such as a display panel or LEDs, and controls the display unit 12a as controlled by the control unit 10. The I/O unit 12 includes a input unit 12b such as a power switch, operating switches, or an operating panel, and controls the input unit 12b as controlled by the control unit 10.

The communication interface 13 includes a first communication interface 131 and second communication interface 132.

The first communication interface 131 has communication ports compatible with a specific serial communication standard such as USB or RS-232C, and a specific parallel communication standard such as IEEE 1284, and communicates with the host computer 3 according to one of these communication protocols as controlled by the control unit 10. Note that the specific serial communication standard such as USB or RS-232C and specific parallel communication standard such as IEEE 1284 are referred to below as compatible communication standards.

The second communication interface 132 has an Ethernet™ communication port and communicates with the host computer 3 as controlled by the control unit 10 through an Ethernet connection. In this embodiment of the invention, the second communication interface 132 can communicate with the host computer 3 through a gigabit Ethernet connection conforming to IEEE-802.3z.

The host computer 3 connects to the communication port of the first communication interface 131 and can communicate with the printing device 2 according to the compatible communication protocol. The host computer 3 also connects through a LAN to the communication port of the second communication interface 132, and can communicate with the printing device 2 through an Ethernet connection.

The second memory 14 is DDR-SDRAM (Double Data Rate SDRAM) or other type of DRAM (Dynamic Random Access Memory), and stores data. The second memory 14 functions as the primary storage device. The data stored in the second memory 14 and how the second memory 14 is used are described further below.

As known from the literature, DRAM requires continuous refreshing to maintain the content in memory when in the normal operating mode (the refresh mode below), and consumes significant power due to the refresh operation.

The storage unit 15 is ROM or other nonvolatile memory, and stores data. Programs related to Linus™, which is a non-real-time OS, and programs that run on Linus are stored in the storage unit 15. These programs are referred to below as non-real-time OS programs LPG.

Programs related to a specific real-time OS, and programs that run on the specific real-time OS, are also stored in the storage unit 15. These programs are referred to below as real-time OS programs RPG.

Non-real-time OS programs LPG are buffered to second memory 14 in the startup process of the printing device 2.

Real-time OS programs RPG are buffered to the first memory 32 described below in the startup process of the printing device 2.

Figure 2:
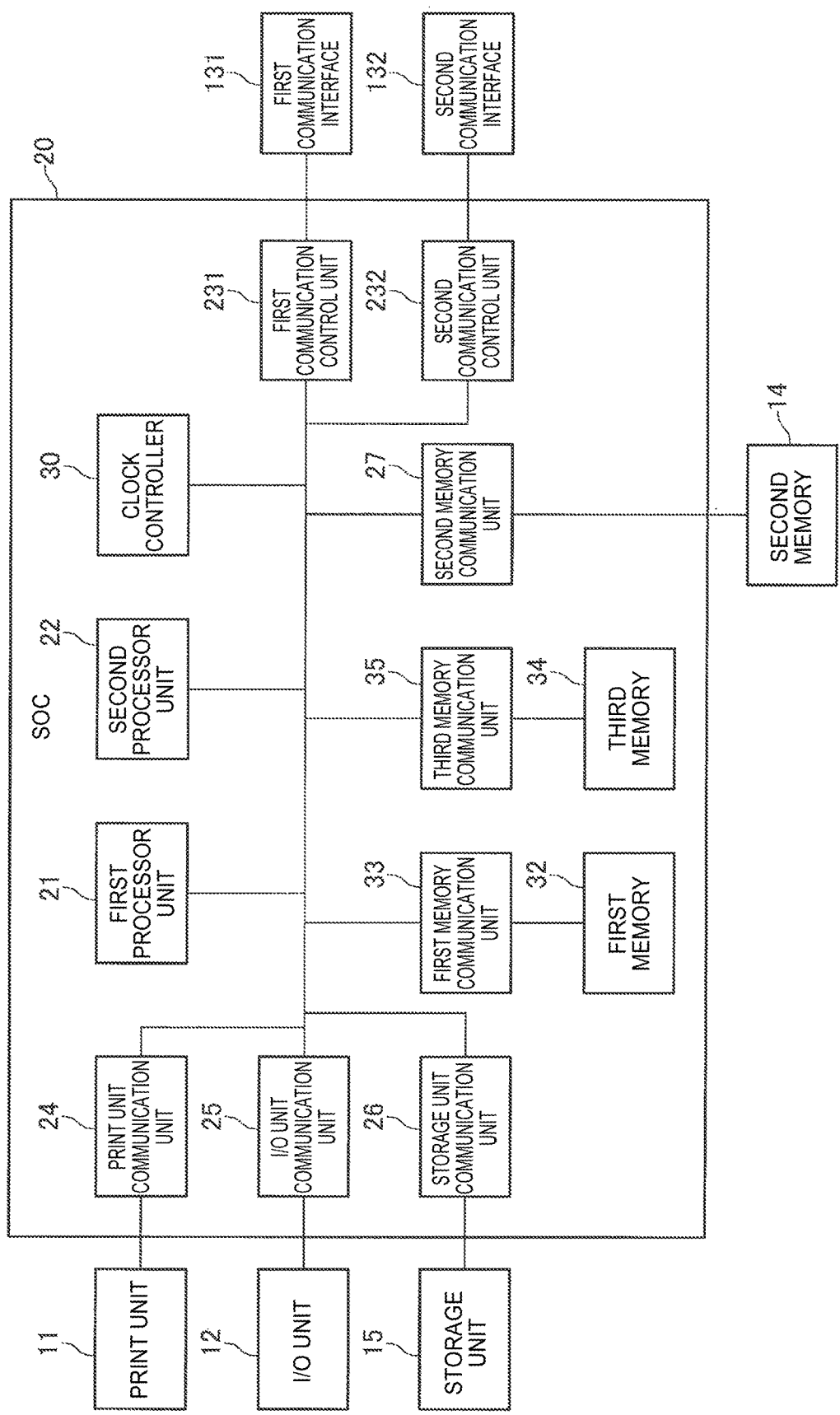
FIG. 2 illustrates the configuration of a system-on-a-chip (SOC).

FIG. 2 is a block diagram illustrating the functional configuration of the SOC 20 (integrated circuit device) in the control unit 10.

As shown in FIG. 2, the SOC 20 includes a first processor unit 21, second processor unit 22, first communication control unit 231, second communication control unit 232, print unit communication unit 24, I/O unit communication unit 25, storage unit communication unit 26, second memory communication unit 27, clock controller 30, first memory 32, first memory communication unit 33, third memory 34, and third memory communication unit 35.

The first processor unit 21 has a first processor embedded in the SOC 20, and reads and runs the real-time OS programs RPG buffered to first memory 32 (described further below). The real-time OS programs RPG include firmware, which is the basic control program of the printing device 2, and a power conservation mode communication control program described below.

The real-time OS programs RPG have a function for controlling the first communication control unit 231, and communicating with the host computer 3 according to the appropriate communication protocol through the first communication interface 131.

The real-time OS programs RPG also have a function for controlling the print unit 11 and a function for controlling the I/O unit 12.

The second processor unit 22 has a second processor embedded in the SOC 20, and reads and runs the non-real-time OS programs LPG buffered to second memory 14.

An non-real-time OS program LPG has a function for controlling the second communication control unit 232 (described below) and communicating with the host computer 3 through the second communication interface 132 using an Ethernet connection.

Note that when not differentiating between the first processor unit 21 and second processor unit 22, they are referred to below as processor units PB.

The first communication control unit 231 has a controller that controls communication with external devices through the first communication interface 131 according to the appropriate communication protocol, and relays communication between the processor units PB and external devices connected to the first communication interface 131.

The second communication control unit 232 has an IP core that controls communication by Ethernet (including gigabit Ethernet) with external devices through the second communication interface 132, and relays communication between the processor units PB and external devices connected to the second communication interface 132.

The print unit communication unit 24 executes a specific process to relay communications between the processor units PB and the print unit 11.

The I/O unit communication unit 25 executes a specific process to relay communications between the processor units PB and the I/O unit 12.

The storage unit communication unit 26 executes a specific process to relay communications between the processor units PB and the storage unit 15.

The second memory communication unit 27 executes a specific process to relay communications between the processor units PB and the second memory 14.

The clock controller 30 has a PLL (phase locked loop), and outputs clock signals at the operating frequency of circuits (first processor unit 21, second processor unit 22) embedded in the SOC 20. The clock controller 30 can change the output frequency of the output clock signals using a clock gear.

The first memory 32 has eDRAM (embedded DRAM), and stores data. As described above, the real-time OS programs RPG are written to the first memory 32 during the startup process.

The first memory communication unit 33 handles communication between the processor units PB and first memory 32.

The third memory 34 has SRAM, and stores data. Work areas for the processor units PB are formed in the third memory 34. Data used in processes of the processor units PB, and data sent and received between the first processor unit 21 and the second processor unit 22, are temporarily stored in the work area in the third memory 34.

The third memory communication unit 35 relays communication between the processor units PB and the third memory 34.

The printing device 2 according to this embodiment comprises a configuration having two processors embedded in a SOC 20, and second memory 14, and reduces power consumption by using non-real-time OS programs LPG buffered to the second memory 14.

More specifically, the printing device 2 has four operating modes, a normal mode (first operating mode) MT, a first power conservation mode (second operating mode) M1, a second power conservation mode (third operating mode) M2, and a third power conservation mode (fourth operating mode) M3, and changes between the four operating modes in stages to reduce power consumption. The power conservation effect increases sequentially from the normal mode MT to the first power conservation mode M1, second power conservation mode M2, and third power conservation mode as described in detail below.

Normal Mode (First Operating Mode) MT

The normal mode MT is described first.

Figure 3:
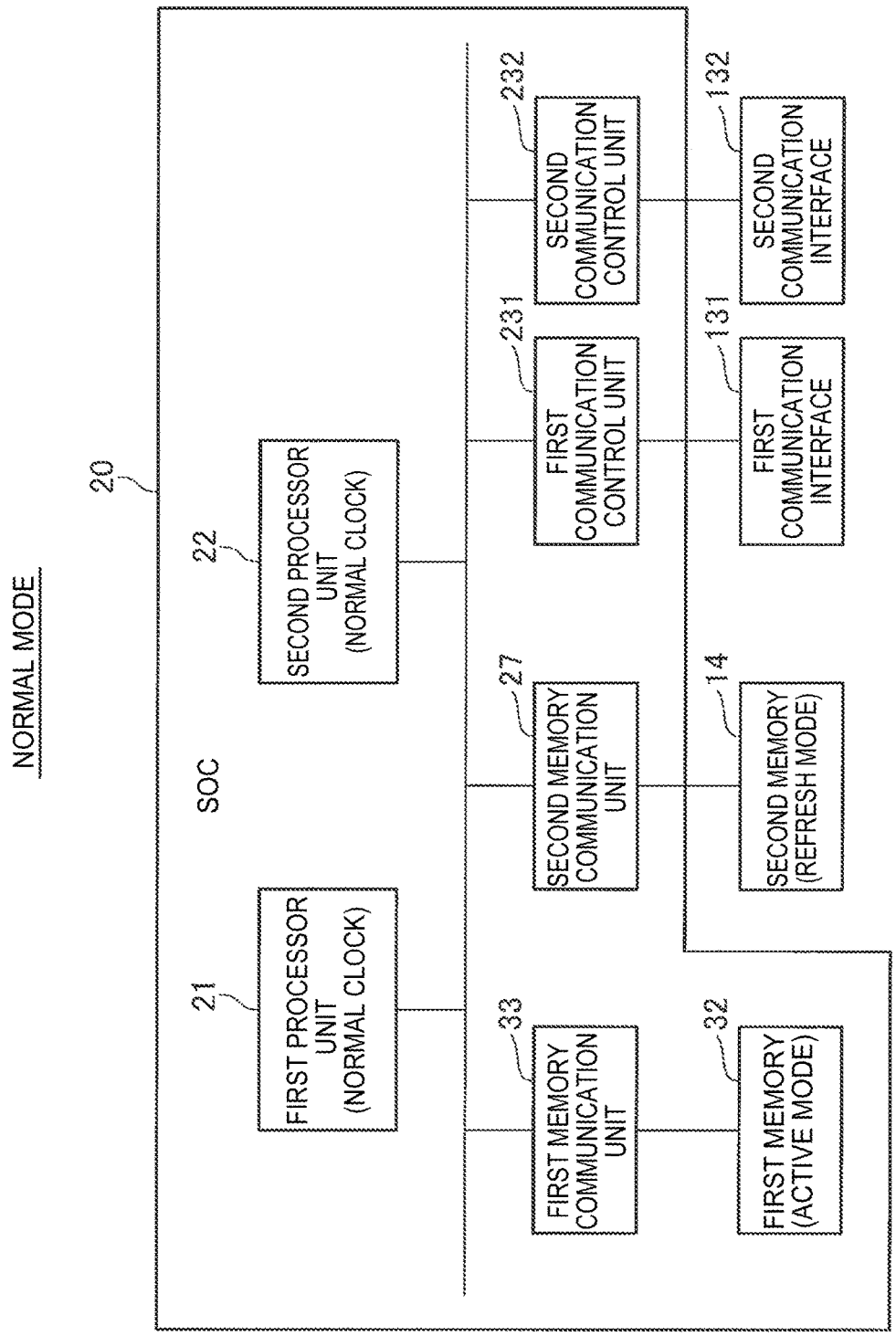
FIG. 3 is a block diagram illustrating main parts of the printing device related to the normal operating mode.

FIG. 3 illustrates the main parts of the printing device 2 for describing the normal mode MT.

Referring to FIG. 3, the operating frequency of the first processor unit 21 in the normal mode MT is a fast clock (normal clock, first clock) of several hundred MHz.

The operating frequency of the second processor unit 22 in the normal mode MT is also a fast clock (normal clock, first clock) of several hundred MHz.

The second memory 14 operates in the refresh mode during the normal mode MT. In the refresh mode, the second memory 14 executes a refresh operation at a specific timing.

The first memory 32 operates in an active mode during the normal mode MT. The active mode enables reading and writing to the first memory 32 at a higher speed than in the slow mode, but power consumption is also greater.

The second memory 14 thus operates in the refresh mode and the first memory 32 operates in the active mode when in the normal mode MT. As a result, in the normal mode MT, the processor units PB can read and write to the first memory 32 and the second memory 14 at a higher speed than in the other modes, but power consumption is also greater.

Processes the First Processor Unit 21 can Execute in the Normal Mode MT

The processes the first processor unit 21 can execute in the normal mode MT are not specifically limited, and the first processor unit 21 can execute processes without limitation based on functions of the real-time OS programs RPG.

More specifically, in the normal mode MT, the first processor unit 21 can execute a process for controlling the first communication control unit 231 and communicating with the host computer 3 through the first communication interface 131 based on a real-time OS program RPG.

The first processor unit 21 can also execute processes for controlling the print unit 11 and controlling the I/O unit 12 based on real-time OS programs RPG buffered to the first memory 32.

Processes the Second Processor Unit 22 can Execute in the Normal Mode MT

The processes the second processor unit 22 can execute in the normal mode MT are not specifically limited, and the second processor unit 22 can execute processes without limitation based on functions of the non-real-time OS programs LPG.

More specifically, in the normal mode MT, the second processor unit 22 can execute a process for controlling the second communication control unit 232 and communicating with the host computer 3 through the second communication interface 132 based on a non-real-time OS program LPG.

Operation of the Printing Device 2 when Printing to the Recording Medium in the Normal Mode MT The operation of the printing device 2 when printing as controlled (instructed) by the host computer 3 in the normal mode MT is described next when (1) the host computer 3 is connected to the first communication interface 131 and communicates according to the appropriate communication protocol, and (2) when the host computer 3 is connected to the second communication interface 132 and communicates through an Ethernet connection.

1. Communication with the Host Computer 3 Using a Compatible Communication Protocol FIG. 4 are flow charts describing the operation of the host computer 3 and the printing device 2 when the printing device 2 in the normal mode MT prints as controlled by the host computer 3 communicating according to a compatible communication protocol. FIG. 4(A) shows the operation of the host computer 3, and FIG. 4(B) shows the operation of the first processor unit 21 of the printing device 2.

As shown in FIG. 4(A), the application execution unit 3a and printer driver execution unit 3b of the host computer 3 generate (step SA1) and send (step SA2) print control data to the printing device 2 by the method described above.

As shown in FIG. 4(B), the first processor unit 21 of the printing device 2 controls the first communication control unit 231 to receive the print control data sent by the host computer 3 through the first communication interface 131 (step SB1). The received print control data is stored to the receive buffer formed in the first memory 32.

Next, the first processor unit 21 reads the print control data stored in the receive buffer (step SB2).

Next, the first processor unit 21, by executing the print control data that was read, controls the print unit 11 according the print control data and prints an image on the recording medium (step SB3).

2. Communication with the Host Computer 3 Using Ethernet

Figure 5A:
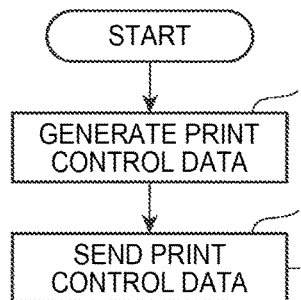
FIGS. 5(A), 5(B) and 5(C) are flow charts describing the operation of a host computer and the printing device in the normal operating mode.
Figure 5B:
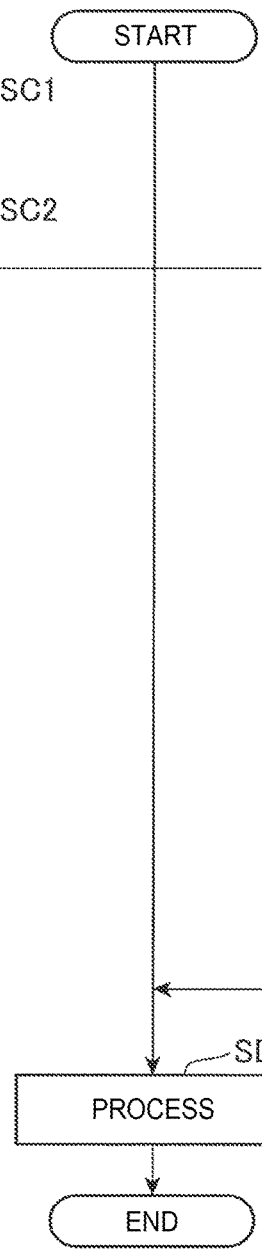
Figure 5C:
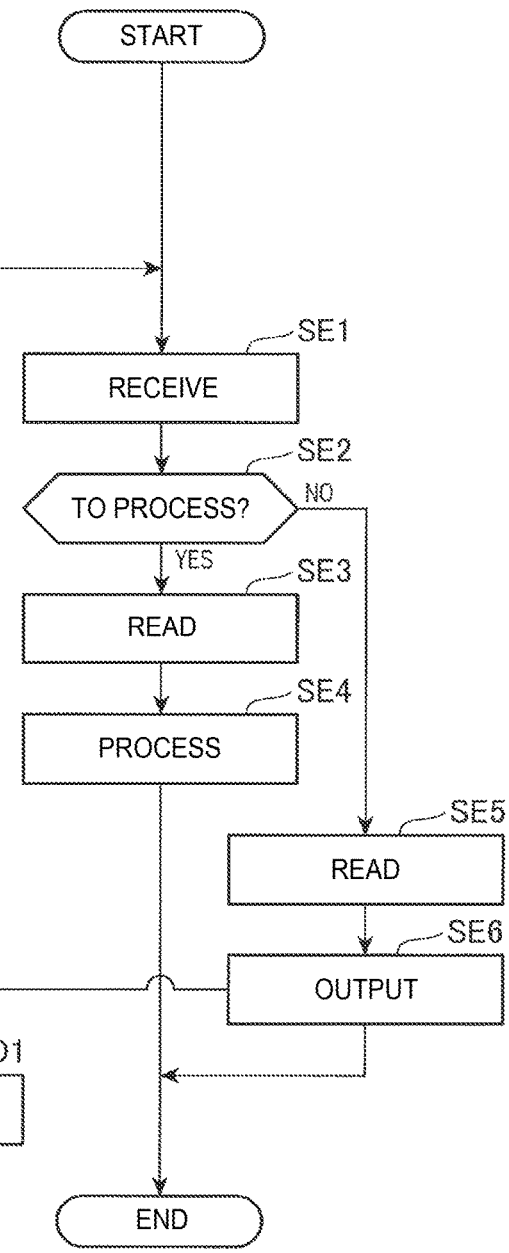

FIG. 5 are flow charts describing the operation of the host computer 3 and the printing device 2 when the printing device 2 in the normal mode MT prints as controlled by the host computer 3 communicating through an Ethernet connection. FIG. 5(A) shows the operation of the host computer 3, FIG. 5(B) shows the operation of the first processor unit 21 of the printing device 2, and FIG. 5(C) shows the operation of the second processor unit 22 of the printing device 2.

As shown in FIG. 5(A), the application execution unit 3a and printer driver execution unit 3b of the host computer 3 generate (step SC1) and send (step SC2) print control data to the printing device 2 by the method described above.

As shown in FIG. 5(C), the second processor unit 22 of the printing device 2 controls the second communication control unit 232 by a function of a non-real-time OS program LPG to receive the print control data sent by the host computer 3 through the second communication interface 132 (step SE1). The received print control data is stored to the receive buffer formed in the second memory 14.

Next, the second processor unit 22 interprets the data (print control data in this example) stored in the receive buffer, and determines if the stored data is data to be processed by the second processor unit 22 (step SE2). If the data is not intended for processing by the second processor unit 22, it is data to be processed by the first processor unit 21.

For example, response request data related to communications sent by TCP/IP is data to be processed by the second processor unit 22. The print control data according to this example, however, is data to be processed by the first processor unit 21.

The second processor unit 22 makes the decision in step SE2 based on information contained in the header of the data (print control data in this example).

If the data stored in the receive buffer is for processing by the second processor unit 22 (step SE2 returns YES), the second processor unit 22 reads (step SE3) and then executes (step SE4) the data. In this example, because the data stored in the receive buffer is print control data (data for processing by the first processor unit 21), the operations of step SE3 and step SE4 are not executed.

Note that the process of the second processor unit 22 reading data stored in the receive buffer from the receive buffer is an example of a reception-related process.

If the data stored in the receive buffer is not for processing by the second processor unit 22 and is data for processing by the first processor unit 21 (step SE2 returns NO), the second processor unit 22 executes the following process. That is, the second processor unit 22 reads the data from the receive buffer (step SE5), and outputs the read data to the first processor unit 21 by interprocessor communication (step SE6).

In this example, the second processor unit 22 reads the print control data from the receive buffer (step SE5), and outputs the read print control data to the first processor unit 21 (step SE6).

As shown in FIG. 5(B), the first processor unit 21 then acquires the data output by the second processor unit 22 (the print control data in this example), controls the print unit 11 based on the print control data, and causes the print unit 11 to print (step SD1).

First Power Conservation Mode (Second Operating Mode) M1

The first power conservation mode M1 is described next.

Figure 6:
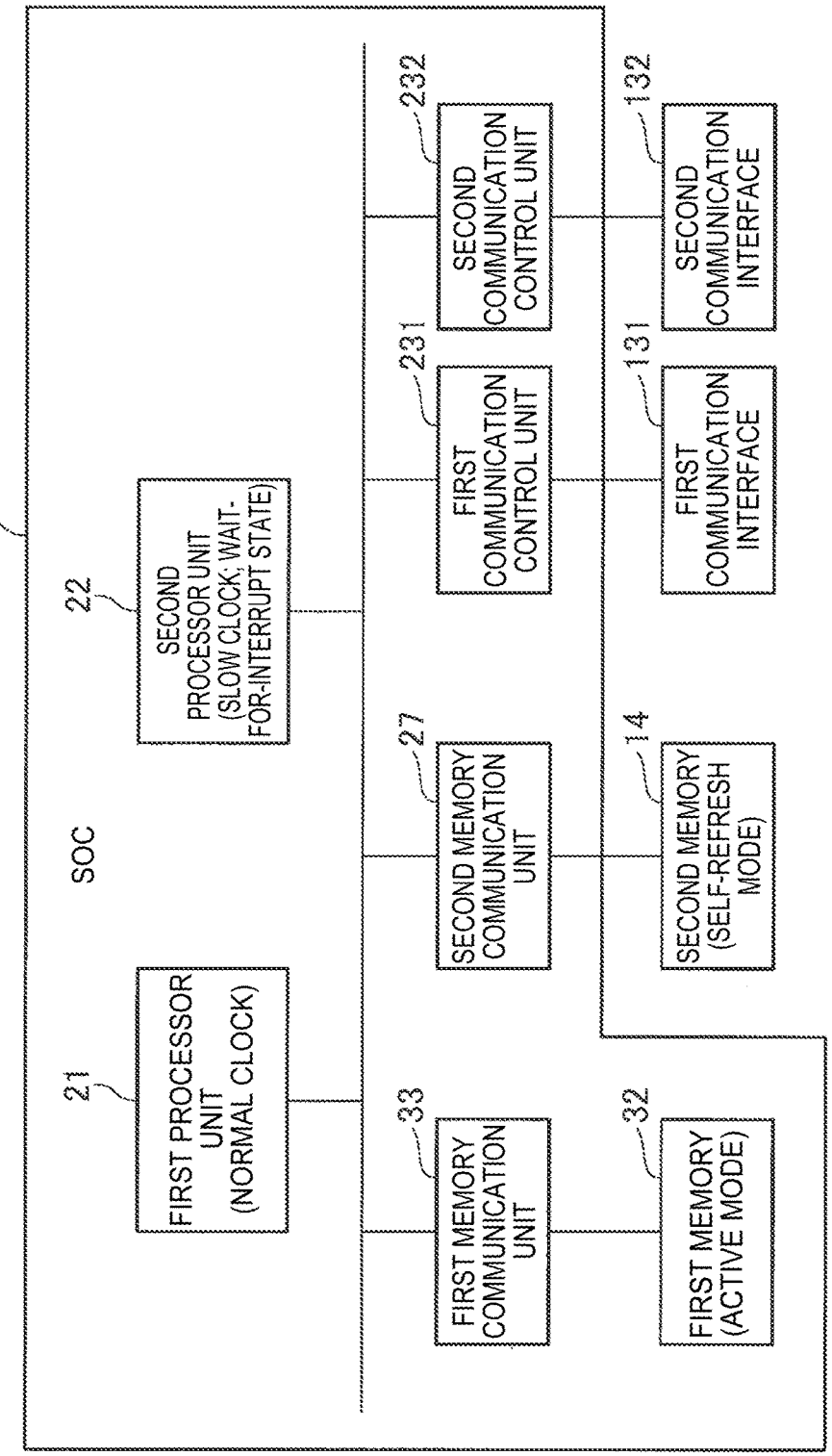
FIG. 6 is a block diagram illustrating main parts of the printing device related to a first power conservation mode.

FIG. 6 illustrates the main parts of the printing device 2 for describing the first power conservation mode M1.

As shown in FIG. 6, the operating frequency of the first processor unit 21 in the first power conservation mode M1 is several hundred MHz (normal clock, first clock) and is the same as in the normal mode MT.

In the first power conservation mode M1, the operating frequency of the second processor unit 22 is several megahertz (slow clock, second clock), and is lower than in the normal mode MT. In this example, the operating frequency is a slow clock of a frequency $\frac{1}{256}$ the frequency of the normal clock, or the normal clock is a fast clock 256 times greater than the slow clock.

In the first power conservation mode M1, the second processor unit 22 goes to a wait-for-interrupt state. When in the wait-for-interrupt state, the second processor unit 22 stops the process (does not pass the process to the processor) until an interrupt signal is input. As a result, the power consumption of the second processor unit 22 in the first power conservation mode M1 is low compared with the power consumption in the normal mode MT.

The second memory 14 operates in a self-refresh mode in the first power conservation mode M1. As known from the literature, when DRAM operates in a self-refresh mode, power consumption is less than when operating in the refresh mode. Note that because the second processor unit 22 goes to the wait-for-interrupt state in the first power conservation mode M1, the second processor unit 22 does not write to the second memory 14, and there is no effect on the operation of the second processor unit 22 due to the second memory 14 going to the self-refresh mode.

In the first power conservation mode M1, the first memory 32 is in the active mode. The first processor unit 21 can therefore write data to the first memory 32 quickly.

Power consumption is therefore lower in the first power conservation mode M1 than in the normal mode because the operating frequency of the second processor unit 22 drops and the second memory 14 operates in the self-refresh mode.

Processes the First Processor Unit 21 can Execute in the First Power Conservation Mode M1

The processes the first processor unit 21 can execute in the first power conservation mode M1 are not specifically limited, and the first processor unit 21 can execute processes without limitation based on functions of the real-time OS programs RPG.

More specifically, in the first power conservation mode M1, the first processor unit 21 can execute a process for controlling the first communication control unit 231 and communicating with the host computer 3 through the first communication interface 131 based on a real-time OS program RPG.

The first processor unit 21 can also execute processes related to controlling the print unit 11 and controlling the I/O unit 12 based on the real-time OS programs RPG.

In the first power conservation mode M1, the first processor unit 21 can also execute the process described below by a function of the power conservation mode communication control program included in the real-time OS program RPG.

More specifically, in the first power conservation mode M1, the first processor unit 21 can receive data from an external device by means of Ethernet through the second communication interface 132 using a function of the power conservation mode communication control program.

Also in the first power conservation mode M1, when the received data is specific data, the first processor unit 21 can process the specific data by a function of the power conservation mode communication control program. When the first processor unit 21 processes the received specific data, the first processor unit 21 and second processor unit 22 does not change from the first power conservation mode to the normal mode.

Data compatible with SNMP (Simple Network Management Protocol) is included in the specific data. Therefore, when SNMP data is received, the first processor unit 21 can execute a process based on the data according to SNMP without resuming the normal mode and without the second processor unit 22 going to the normal mode.

As a result, when specific data is received from an external device, the data can be processed by the first processor unit 21 without going to the normal mode by means of the power conservation mode communication control program even when the second processor unit 22 has entered the first power conservation mode M1 and is in a wait-for-interrupt state.

More specifically, in the first power conservation mode M1, the first processor unit 21 renders some functions of the second processor unit 22 that communicate with external devices through the second communication interface 132 without changing the operating mode. As a result, transition from the first power conservation mode M1 to the normal mode can be suppressed and more effective power conservation can be achieved.

In addition, in the first power conservation mode M1, the first processor unit 21 executes the following process by a function of the power conservation mode communication control program included in the real-time OS programs RPG.

Specifically, when data not intended for processing by the first processor unit 21 is received from an external device through the second communication interface 132, the first processor unit 21 executes the following process by a function of the power conservation mode communication control program. The first processor unit 21 outputs an interrupt signal reporting entering the normal mode MT to the second processor unit 22 by interprocess communication, and changes the operating mode of the second processor unit 22 from the first power conservation mode M1 to the normal mode MT. After entering the normal mode MT, the second processor unit 22 reads data from the receive buffer and processes the read data.

Processes the Second Processor Unit 22 Can Execute in the First Power Conservation Mode M1

As described above, the second processor unit 22 goes to the wait-for-interrupt state in the first power conservation mode M1. As a result, the second processor unit 22 does not run a process until an interrupt signal is input.

Going from the Normal Mode MT to the First Power Conservation Mode M1, and Going from the First Power Conservation Mode M1 to the Normal Mode MT Going from the normal mode MT to the first power conservation mode M1 happens when a particular condition J1 is met.

This condition J1 is a condition that is met when the second processor unit 22 becoming unable to execute processes is permitted.

For example, one condition qualifying as condition J1 is that there has been no Ethernet-based communication through the second communication interface 132 for a specific time.

Going (returning) from the first power conservation mode M1 to the normal mode MT happens when a particular condition J1' is met.

This condition J1' is a condition that is met when the second processor unit 22 executing a process, or reading or writing data to the second memory 14, is required.

For example, one condition qualifying as condition J1' is that data for processing by the second processor unit 22 is received by Ethernet communication through the second communication interface 132.

Operation of the Printing Device 2 when Printing to the Recording Medium in the First Power Conservation Mode M1

The operation of the printing device 2 when printing as controlled (instructed) by the host computer 3 in the first power conservation mode M1 is described next when (1) the host computer 3 is connected to the first communication interface 131 and communicates using the corresponding communication protocol, and (2) when the host computer 3 is connected to the second communication interface 132 and communicates through an Ethernet connection.

1. Communication with the Host Computer 3 Using a Compatible Communication Protocol When printing as controlled by the host computer 3 communicating through a compatible communication protocol, the printing device 2 in the first power conservation mode M1 executes the process described with reference to the flow chart in FIG. 4(B).

As described above, in the first power conservation mode M1 the first processor unit 21 operates at the normal clock, the first memory 32 is in the active mode, and the processes the first processor unit 21 can execute are not specifically limited. As a result, the first processor unit 21 executes the same processes as when in the normal mode MT.

2. Communication with the Host Computer 3 Using Ethernet

FIG. 7 are flow charts describing the operation of the host computer 3 and the printing device 2 when the printing device 2 in the first power conservation mode M1 prints as controlled by the host computer 3 communicating through an Ethernet connection. FIG. 7(A) shows the operation of the host computer 3, FIG. 7(B) shows the operation of the first processor unit 21 of the printing device 2, and FIG. 7(C) shows the operation of the second processor unit 22 of the printing device 2.

As shown in FIG. 7(A), the application execution unit 3a and printer driver execution unit 3b of the host computer 3 generate (step SF1) and send (step SF2) print control data to the printing device 2 by the method described above.

As shown in FIG. 7(B), the first processor unit 21 controls the second communication control unit 232 by a function of the power conservation mode communication control program included a real-time OS program RPG to receive the print control data sent by the host computer 3 through the second communication interface 132 (step SG1). The received print control data is stored to the receive buffer formed in the first memory 32.

Next, the first processor unit 21 interprets the print control data stored in the receive buffer, and determines if the print control data is data that can be processed by a function of the power conservation mode communication control program (step SG2).

In step SG2, the first processor unit 21 makes the decision based on information contained in the header of the data (print control data in this example).

If the data stored in the receive buffer is data that can be processed by a function of the power conservation mode communication control program (step SG2 returns YES), the first processor unit 21 reads (step SG3) and then executes (step SG4) the data. In this example, because the data stored in the receive buffer is print control data and is data that cannot be processed by a function of the power conservation mode communication control program, the operations of step SG3 and step SG4 are not executed.

If the data stored in the receive buffer is data that cannot be processed by a function of the power conservation mode communication control program (step SG2 returns NO), the first processor unit 21 executes the process described below. That is, the first processor unit 21 outputs an interrupt signal reporting transition to the normal mode MT to the second processor unit 22 by interprocessor communication (step SG5).

As shown in FIG. 7(C), the second processor unit 22 changes the operating mode from the first power conservation mode M1 to the normal mode MT in response to the input interrupt signal (step SH1).

When changing from the first power conservation mode M1 to the normal operating mode, the operating frequency of the second processor unit 22 changes to the normal clock, the second memory 14 operates in the refresh mode, and the second processor unit 22 can execute processes without specific limitation.

As shown in FIG. 7(B), after outputting the interrupt signal, the first processor unit 21 outputs a signal to the second processor unit 22 reporting that data for processing by the second processor unit 22 was stored in the receive buffer (step SG6).

As shown in FIG. 7(C), the second processor unit 22 then reads the data (print control data in this example) from the receive buffer based on input of the signal output by the first processor unit 21 (step SH2)

Next, the second processor unit 22 executes a process based on the read data (step SH3). If the data that was read is print control data, the second processor unit 22 outputs the read print control data to the first processor unit 21 by interprocessor communication in step SH3.

As shown in FIG. 7(B), the first processor unit 21 then acquires the data output by the second processor unit 22 (the print control data in this example), and executes a process based on the data (step SG7). In this example, the first processor unit 21 controls the print unit 11 based on the print control data to print on the recording medium in step SG7.

Second Power Conservation Mode (Third Operating Mode) M2

The second power conservation mode M2 is described next.

Figure 8:
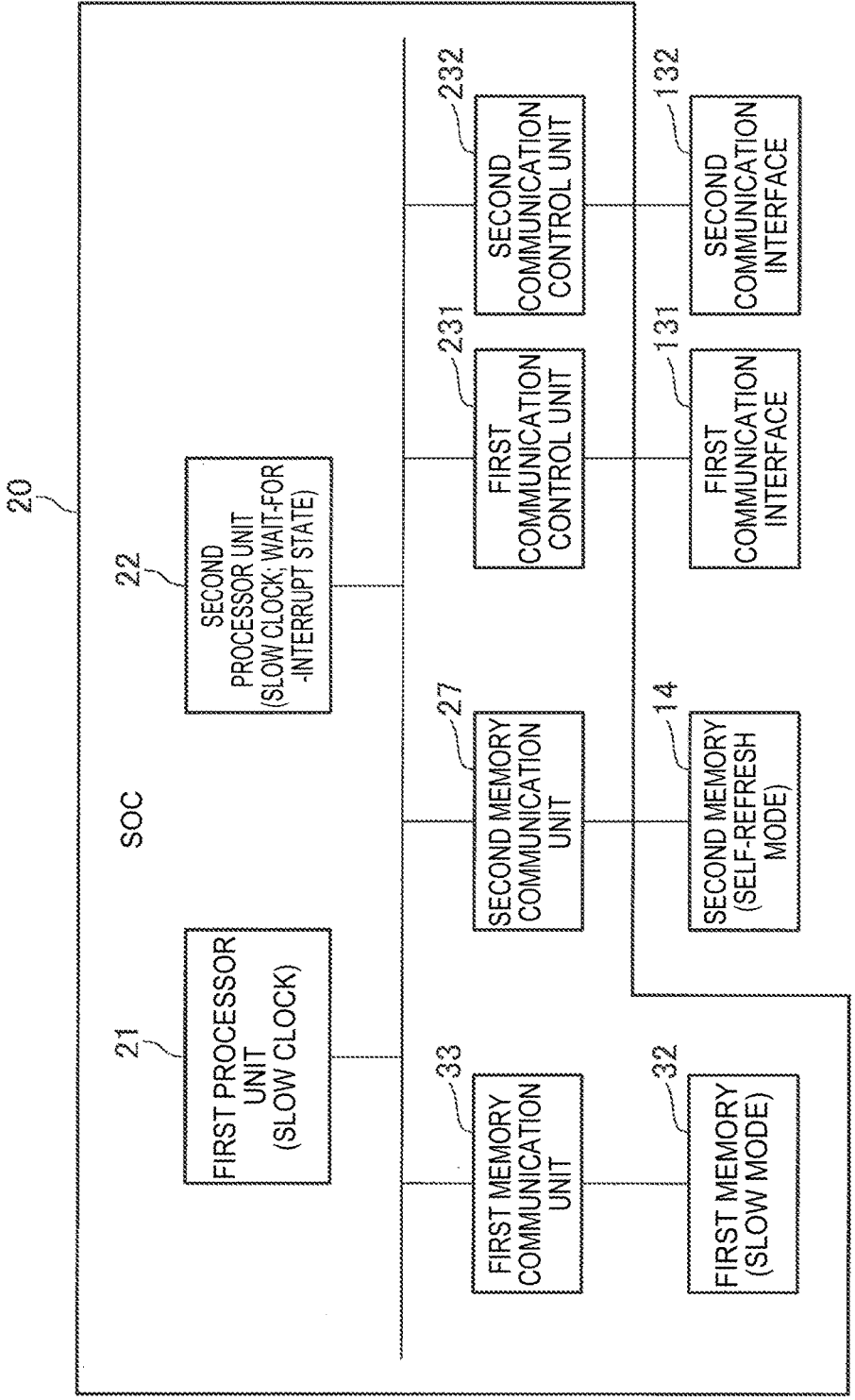
FIG. 8 is a block diagram illustrating main parts of the printing device related to a second power conservation mode.

FIG. 8 illustrates the main parts of the printing device 2 for describing the second power conservation mode M2.

As shown in FIG. 8, the operating frequency of the first processor unit 21 in the second power conservation mode M2 is several ten MHz (slow clock, second clock). The operating frequency of the first processor unit 21 is lower in the second power conservation mode M2 than in the normal mode MT and the first power conservation mode M1, and the first processor unit 21 therefore consumes less power when in the second power conservation mode M2 than in the normal mode MT and the first power conservation mode M1. In this example, the operating frequency is a slow clock with a frequency $\frac{1}{16}$ the normal clock.

The second processor unit 22 operates in the same state in the second power conservation mode M2 and the first power conservation mode M1. More specifically, the operating frequency of the second processor unit 22 is several megahertz (slow clock, second clock). The second processor unit 22 is also in the wait-for-interrupt state. In this example, the operating frequency is a slow clock with a frequency $\frac{1}{256}$ the normal clock.

In the second power conservation mode M2, the second memory 14 operates in the self-refresh mode.

In the second power conservation mode M2, the first memory 32 is in a slow mode. The first memory 32 operates at a slower speed in the slow mode than in the active mode, power consumption is therefore suppressed, and power can be saved.

Because the operating frequency of the first processor unit 21 drops and the first memory 32 operates in a slow mode in the second power conservation mode M2, greater power conservation can be achieved than in the first power conservation mode M1.

Processes the First Processor Unit 21 can Execute in the Second Power Conservation Mode M2

As described above, the operating frequency of the first processor unit 21 is low and the first memory 32 operates in the slow mode when in the second power conservation mode M2. As a result, the processes the first processor unit 21 can execute are limited in the second power conservation mode M2, and the first processor unit 21 goes to a state able to execute a predetermined process (specific process).

More specifically, in the second power conservation mode M2, the first processor unit 21 cannot control the print unit 11 to print images on the recording medium.

The specific process is a process that the first processor unit 21 can execute at the slow clock and requires processing even after the first processor unit 21 goes to the second power conservation mode M2. For example, the specific process may be controlling the I/O unit 12.

Also in the second power conservation mode M2, the first processor unit 21 controls the first communication control unit 231 based on a real-time OS program RPG, and receives data from an external device through the first communication interface 131.

Also in the second power conservation mode M2, the first processor unit 21 controls the second communication control unit 232 based on the power conservation mode communication control program contained in the real-time OS program RPG, and receives data from an external device through the second communication interface 132.

Processes the Second Processor Unit 22 can Execute in the Second Power Conservation Mode M2

As described above, the second processor unit 22 goes to the wait-for-interrupt state in the second power conservation mode M2. As a result, the second processor unit 22 does not execute a process until an interrupt signal is input.

Going from the First Power Conservation Mode M1 to the Second Power Conservation Mode M2, and Going from the Second Power Conservation Mode M2 to the First Power Conservation Mode M1

Going from the first power conservation mode M1 to the second power conservation mode M2 happens when a particular condition J2 is met.

This condition J2 is a condition that is met when entering a state in which the first processor unit 21 can execute a predetermined process (specific process) is permitted.

For example, one condition qualifying as condition J2 is when the first processor unit 21 does not execute a specific process for a specific time.

Going from the second power conservation mode M2 to the first power conservation mode M1 happens when a particular condition J2' is met.

This condition J2' is met when a process is created that should be executed by the first processor unit 21 operating at the normal clock.

For example, one condition qualifying as condition J2' is when a need for the first processor unit 21 to execute a specific process occurs.

Operation of the Printing Device 2 when Printing to the Recording Medium in the Second Power Conservation Mode M2

The operation of the printing device 2 when printing as controlled (instructed) by the host computer 3 in the second power conservation mode M2 is described next when (1) the host computer 3 is connected to the first communication interface 131 and communicates using the corresponding communication protocol, and (2) when the host computer 3 is connected to the second communication interface 132 and communicates through an Ethernet connection.

Figure 9:
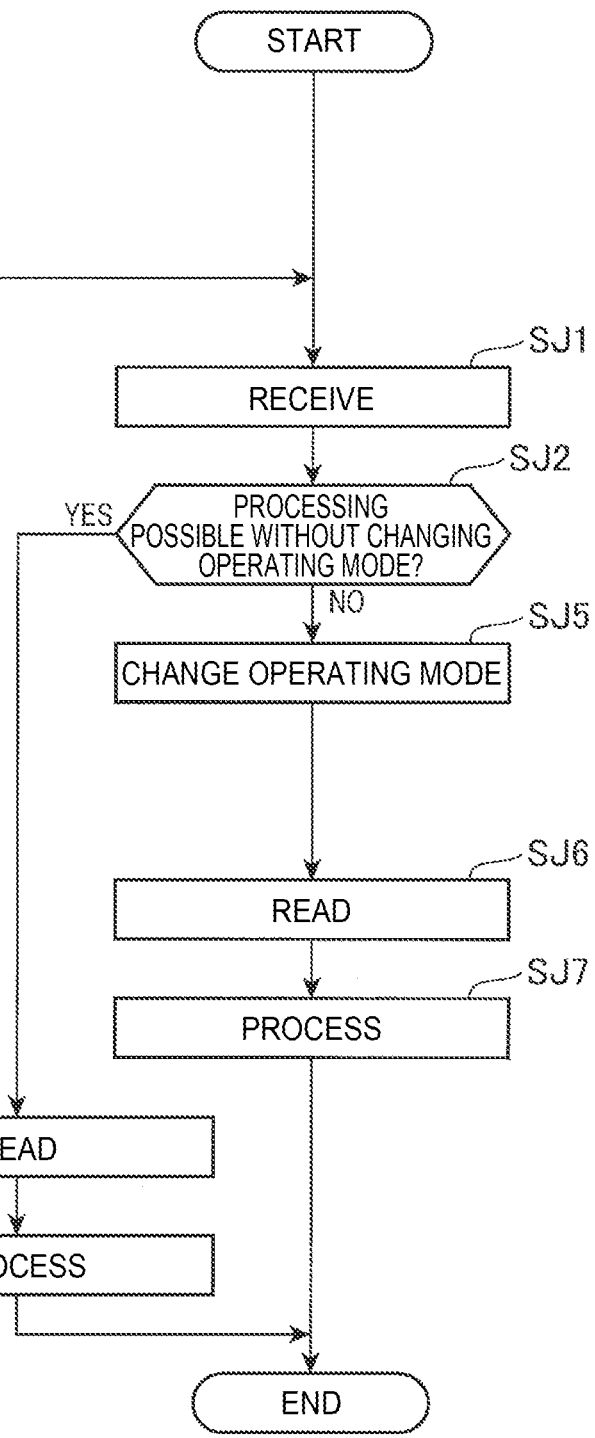
FIGS. 9(A) and 9(B) are flow charts describing the operation of a host computer and the printing device in the second power conservation mode.

1. Communication with the Host Computer 3 Using a Compatible Communication Protocol FIG. 9 are flow charts describing the operation of the host computer 3 and the printing device 2 when the printing device 2 in the second power conservation mode M2 prints as controlled by the host computer 3 communicating according to the appropriate communication protocol. FIG. 9(A) shows the operation of the host computer 3, and FIG. 9(B) shows the operation of the first processor unit 21 of the printing device 2.

As shown in FIG. 9(A), the application execution unit 3a and printer driver execution unit 3b of the host computer 3 generate (step SI1) and send (step SI2) print control data to the printing device 2 by the method described above.

As shown in FIG. 9(B), the first processor unit 21 of the printing device 2 controls the first communication control unit 231 to receive the print control data sent by the host computer 3 using the corresponding communication protocol (step SJ1). The received print control data is stored to the receive buffer formed in the first memory 32.

Next, the first processor unit 21 determines if the data (print control data in this example) is data that can be processed in the second power conservation mode M2 (step SJ2). The specific data the first processor unit 21 can process with the first processor unit 21 operating at the slow clock and the first memory 32 in the slow mode is previously defined as data that can be processed in the second power conservation mode M2. The first processor unit 21 makes the decision in step SJ2 based on information contained in the header of the data. The print control data in this example is not specific data that can be processed by the first processor unit 21 in the second power conservation mode M2.

If the data can be processed in the second power conservation mode M2 (step SJ2 returns YES), the first processor unit 21 reads (step SJ3) and processes (step SJ4) the data.

If the data is not data that can be processed in the second power conservation mode M2 (step SJ2 returns NO), the first processor unit 21 goes from the second power conservation mode M2 to the first power conservation mode M1 (step SJ5).

Next, the first processor unit 21 reads (step SJ6) and processes (step SJ7) the data. In this example, the first processor unit 21 reads print control data in step SJ6, and in step SJ7 the first processor unit 21 executes the print control data that was read and prints with the print unit 11.

2. Communication with the Host Computer 3 Using Ethernet

FIG. 10 are flow charts describing the operation of the host computer 3 and the printing device 2 when the printing device 2 in the second power conservation mode M2 prints as controlled by the host computer 3 communicating through an Ethernet connection. FIG. 10(A) shows the operation of the host computer 3, FIG. 10(B) shows the operation of the first processor unit 21 of the printing device 2, and FIG. 10(C) shows the operation of the second processor unit 22 of the printing device 2.

As shown in FIG. 10(A), the application execution unit 3a and printer driver execution unit 3b of the host computer 3 generate (step SL1) and send (step SL2) print control data to the printing device 2 by the method described above.

As shown in FIG. 10(B), the first processor unit 21 controls the second communication control unit 232 to receive the print control data sent by the host computer 3 (step SM1). The received print control data is stored to the receive buffer formed in the first memory 32.

Next, the first processor unit 21 interprets the print control data stored in the receive buffer, and determines if the print control data is data that can be processed in the second power conservation mode M2 (step SM2).

If the data is data that can be processed in the second power conservation mode M2 (step SM2 returns YES), the first processor unit 21 reads (step SM3) and processes (step SM4) the data.

If the data is not data that can be processed in the second power conservation mode M2 (step SM2 returns NO), the first processor unit 21 changes from the second power conservation mode M2 to the first power conservation mode M1 (step SM5).

Next, the first processor unit 21 outputs an interrupt signal instructing changing from the second power conservation mode M2 to the normal mode MT to the second processor unit 22 (step SM6).

As shown in FIG. 10(C), the second processor unit 22 changes the operating mode from the second power conservation mode M2 to the normal mode MT in response to the interrupt signal output by the first processor unit 21 (step SN1).

As shown in FIG. 10(B), after outputting the interrupt signal, the first processor unit 21 outputs a signal to the second processor unit 22 reporting that data for processing by the second processor unit 22 was stored in the receive buffer (step SM6).

As shown in FIG. 10(C), the second processor unit 22 then reads the data (print control data in this example) from the receive buffer based on input of the signal output by the first processor unit 21 (step SN2)

Next, the second processor unit 22 executes a process based on the read data (step SN3). If the data that was read is print control data, the second processor unit 22 outputs the read print control data to the first processor unit 21 by interprocessor communication in step SN3

As shown in FIG. 10(B), the first processor unit 21 then acquires the data output by the second processor unit 22, and executes a process based on the data (step SM8). In this example, the first processor unit 21 controls the print unit 11 based on the print control data to print on the recording medium in step SM8.

Third Power Conservation Mode (Fourth Operating Mode) M3

The third power conservation mode M3 is described next.

Figure 11:
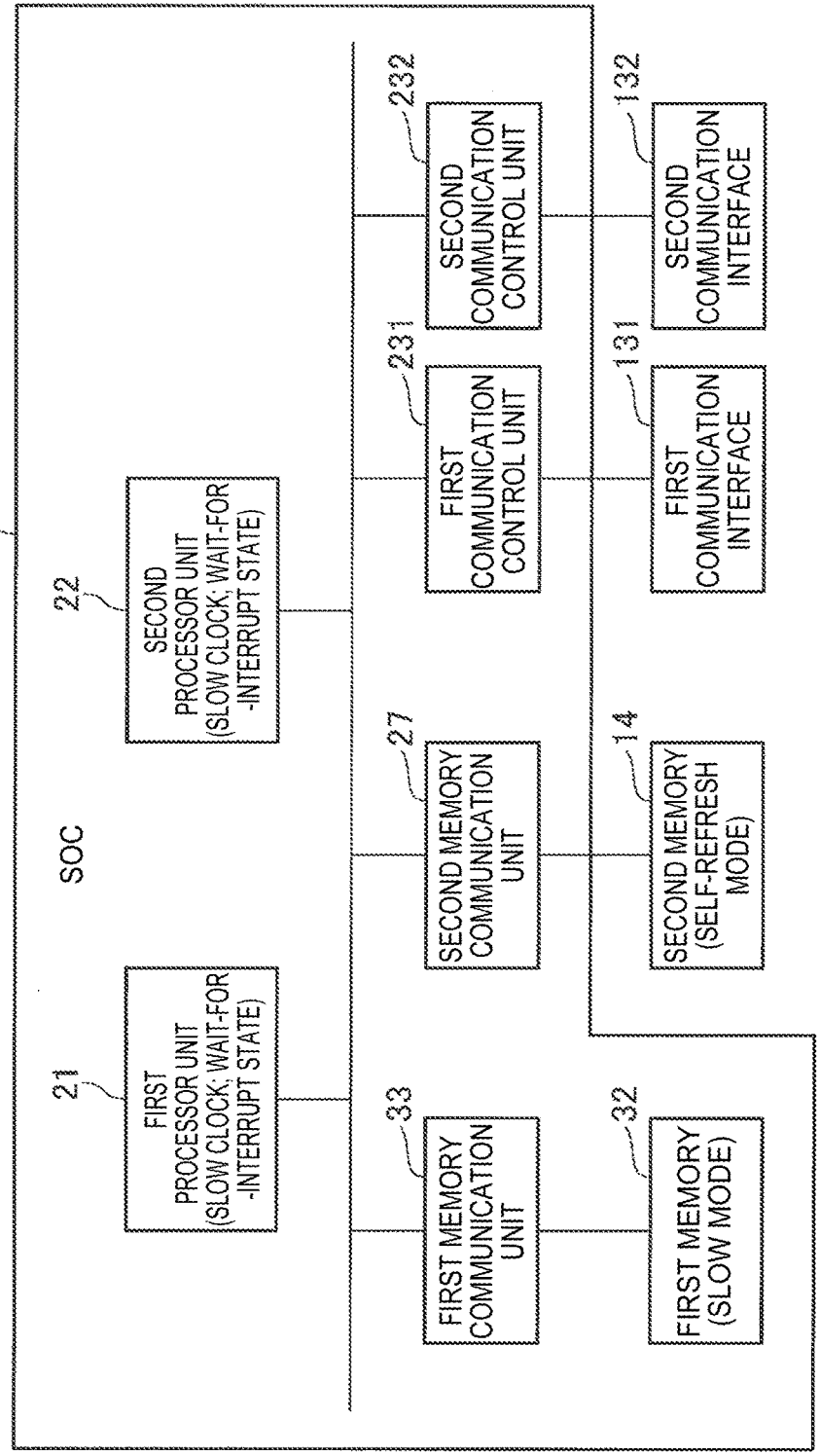
FIG. 11 is a block diagram illustrating main parts of the printing device related to a third power conservation mode.

FIG. 11 illustrates the main parts of the printing device 2 for describing the third power conservation mode M3.

As shown in FIG. 11, the operating frequency of the first processor unit 21 in the third power conservation mode M3 is several ten MHz (slow clock, second clock). The first processor unit 21 also goes to the wait-for-interrupt state. The operating frequency of the first processor unit 21 is a slow clock with a frequency $\frac{1}{16}$ the normal clock. The normal clock is a fast clock 16 times the operating frequency of the slow clock.

The second processor unit 22 operates in the same state in the third power conservation mode M3 as in the second power conservation mode M2 and the first power conservation mode M1. More specifically, the operating frequency of the second processor unit 22 is several megahertz (slow clock, second clock). The second processor unit 22 is also in the wait-for-interrupt state. In this example, the operating frequency is a slow clock with a frequency $\frac{1}{256}$ the normal clock.

In the third power conservation mode M3, the second memory 14 operates in the self-refresh mode.

In the third power conservation mode M3, the first memory 32 is in a slow mode.

Because the first processor unit 21 goes to the wait-for-interrupt state in the third power conservation mode M3, power conservation is greater than in the second power conservation mode M2.

Processes the First Processor Unit 21 can Execute in the Third Power Conservation Mode M3

As described above, the first processor unit 21 goes to the wait-for-interrupt state in the third power conservation mode M3. As a result, the first processor unit 21 does not execute a process until an interrupt signal is input.

Processes the Second Processor Unit 22 can Execute in the Third Power Conservation Mode M3

As described above, the second processor unit 22 goes to the wait-for-interrupt state in the third power conservation mode M3. As a result, the second processor unit 22 does not execute a process until an interrupt signal is input.

Going from the Second Power Conservation Mode M2 to the Third Power Conservation Mode M3, and Going from the Third Power Conservation Mode M3 to the Second Power Conservation Mode M2

Going from the second power conservation mode M2 to the third power conservation mode M3 happens when a particular condition J3 is met.

This condition J3 is a condition that is met when the first processor unit 21 going to the wait-for-interrupt state is permitted.

For example, one condition qualifying as condition J3 is when the first processor unit 21 does not execute a specific process for a specific time.

Going from the third power conservation mode M3 to the second power conservation mode M2 happens when a particular condition J3' is met.

This condition J3' is met when an event requiring cancelling the wait-for-interrupt state of the first processor unit 21 occurs.

For example, one condition qualifying as condition J3' is when an interrupt process occurs in the first processor unit 21 (when an interrupt signal is input).

Operation of the Printing Device 2 when Printing to the Recording Medium in the Third Power Conservation Mode M3

The operation of the printing device 2 when printing as controlled by the host computer 3 in the third power conservation mode M3 is described next when (1) the host computer 3 is connected to the first communication interface 131 and communicates using the corresponding communication protocol, and (2) when the host computer 3 is connected to the second communication interface 132 and communicates through an Ethernet connection.

1. Communication with the Host Computer 3 Using a Compatible Communication Protocol When the host computer 3 sends print control data through the first communication interface 131 using a compatible communication protocol, the first communication control unit 231 outputs an interrupt signal to the first processor unit 21 and second processor unit 22 indicating that print control data was sent.

Based on the input interrupt signal, the first processor unit 21 and second processor unit 22 change from the third power conservation mode M3 to the second power conservation mode M2. After entering the second power conservation mode M2, the first processor unit 21 executes the steps shown in the flowchart of FIG. 9(B), and the second processor unit 22 executes the steps shown in the flow chart in FIG. 9(C).

As a result of these steps, the operating modes of the first processor unit 21 and second processor unit 22 change based on the content of the input data, and the data is processed. If the data is print control data, content based on the print control data is printed.

2. Communication with the Host Computer 3 Using Ethernet

When the host computer 3 sends print control data through the first communication interface 131 using an Ethernet connection, the first communication control unit 231 outputs an interrupt signal to the first processor unit 21 and second processor unit 22 indicating that print control data was sent.

The first processor unit 21 and second processor unit 22 then change from the third power conservation mode M3 to the second power conservation mode M2 based on input of the interrupt signal. After entering the second power conservation mode M2, the first processor unit 21 executes the steps shown in the flow chart in FIG. 10(B), and the second processor unit 22 executes the steps shown in the flow chart in FIG. 10(C).

As a result of these steps, the operating modes of the first processor unit 21 and second processor unit 22 change based on the content of the input data, and the data is processed. If the data is print control data, content based on the print control data is printed.

Operation of the printing device 2 when changing the operating mode is described next using going from the normal mode MT to the first power conservation mode M1 as an example.

Figure 12:
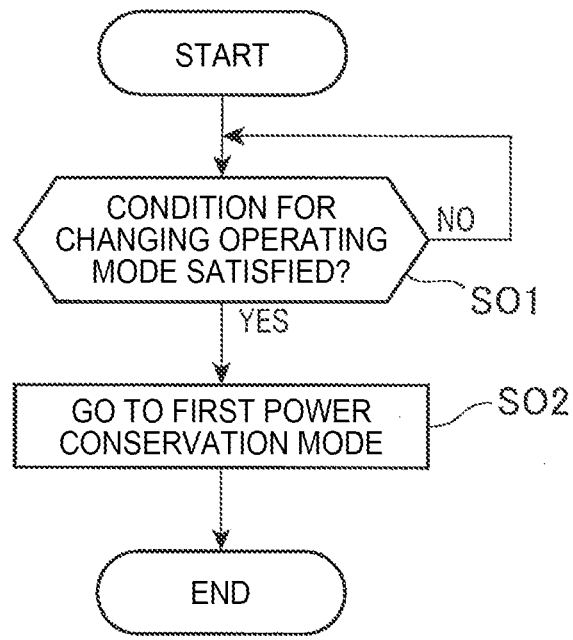
FIG. 12 is a flow chart describing the operation of the printing device.

FIG. 12 is a flow chart describing the operation of the printing device 2.

When the operation shown in the flow chart in FIG. 12 starts, the operating mode of the printing device 2 is the normal mode MT.

As shown in FIG. 12, while operating in the normal mode MT, the processor unit PB monitors whether or not a condition for changing the operating mode to the first power conservation mode M1 is satisfied (step SO1). Monitoring in step SO1 whether to change the operating mode is done as described below.

The conditions are grouped in this example as one or more conditions X that the first processor unit 21 can monitor, and one or more conditions Y that the second processor unit 22 can monitor. The first processor unit 21 then monitors in step SO1 if condition X was met. The second processor unit 22 also monitors in step SO1 if condition Y was met, and reports to the first processor unit 21 if condition Y is satisfied. If the first processor unit 21 detects that condition X is satisfied and also learns from the second processor unit 22 that condition Y is satisfied, the first processor unit 21 determines the condition for changing to the first power conservation mode M1 is met.

Note that the method of detecting if the condition is met is not limited to the foregoing. If at least one processor unit PB can detect that the condition is satisfied, any desirable method may be used.

If the condition is met (step SO1 returns YES), the processor unit PB changes the operating mode from the normal mode MT to the first power conservation mode M1 (step SO2).

As described above, by changing the operating mode to the first power conservation mode M1, the second memory 14 operates in the self-refresh mode, the second processor unit 22 goes to the wait-for-interrupt state, and power is saved.

As described above, a printing device 2 (information processing device) according to this embodiment of the invention includes a first processor unit 21 (first processor) that runs a program stored to first memory 32, and a second processor unit 22 (second processor) that runs a program stored in second memory 14. The operating modes of the printing device 2 include a normal mode MT in which the first processor unit 21 and second processor unit 22 operate according to a normal clock; and a first power conservation mode M1 in which the first processor unit 21 operates at the normal clock and the second processor unit 22 operates at a slow clock with an operating frequency lower than the normal clock after going to a state in which the first processor unit 21 can execute some processes of the second processor unit 22.

Thus comprised, after enabling the first processor unit 21 to execute some processes of the second processor unit 22 in the first power conservation mode M1, the first processor unit 21 operates at the normal clock and the second processor unit 22 operates at a slow clock with an operating frequency lower than the normal clock. As a result, the clock frequency of the second processor unit 22 is lowered to save power while maintaining a state enabling executing the processes of the second processor unit 22 that are essential. In other words, this embodiment of the invention enables efficiently saving power in a configuration having multiple processors.

In this embodiment of the invention, the second memory 14 is memory that requires refreshing during normal operation. In the first power conservation mode M1, the second memory 14 operates in the self-refresh mode.

Thus comprised, the second memory 14 can operate in the second memory 14 in the first power conservation mode M1, and can achieve more efficient power conservation.

In this embodiment of the invention the second processor unit 22 goes to the wait-for-interrupt state in the first power conservation mode M1.

Thus comprised, the second processor unit 22 is changed to the wait-for-interrupt state in the first power conservation mode M1, and more efficient power conservation can be achieved.

One operating mode of the printing device 2 according to this embodiment is a second power conservation mode M2 in which the first processor unit 21 and second processor unit 22 operates at a slow clock.

Thus comprised, when the first processor unit 21 and second processor unit 22 can operate at a slow clock, the operating mode changes to the second power conservation mode M2 and more efficient power conservation can be achieved.

Another operating mode of the printing device 2 according to this embodiment is a third power conservation mode M3 in which the first processor unit 21 operates at a slow clock and goes to the wait-for-interrupt state, and the second processor unit 22 operates at a slow clock.

This aspect of the invention changes the operating mode to the third power conservation mode M3 to enable more efficient power consumption when the first processor unit 21 operates at the slow clock and goes to the wait-for-interrupt state, and the second processor unit 22 can operate at the slow clock.

The first processor unit 21 runs the program written to the first memory 32 and executes a process related to controlling itself, and the second processor unit 22 runs a program stored to the second memory 14 and executes a process related to communicating with an external device (including the host computer 3). In the first power conservation mode M1, the first processor unit 21 executes part of a process related to communication with the host computer 3.

Thus comprised, while maintaining some processes related to control of the printing device 2 and some processes related to communicating with an external device, the operating frequency of the second processor unit 22 clock is lowered and power conservation can be achieved when in the first power conservation mode M1.

The invention is described above with reference to a preferred embodiment thereof, but the invention is not limited thereto and can be modified and adapted in many ways without departing from the scope of the accompanying claims.

For example, the present invention is described above using a device (printing device 2) with a printing function as an example of an information processing device according to the invention, but the information processing devices to which the invention can be applied are not limited to devices with a print function. More specifically, the invention can be applied to integrated circuits having multiple processors, and to devices using the integrated circuits.

The disclosure being thus described, it will be apparent to those skilled in the art that it may be varied in many ways. Such variations are not to be regarded as a departure from the spirit and scope of the disclosure, and all such modifications as would be apparent to one skilled in the art are intended to be included within the scope of the following claims.

What is claimed is:

1. An information processing device comprising:
a first communication interface for communicating via a serial communication standard;
a second communication interface or communicating via network communication;

a first processor that runs a program stored in a first memory, the first processor communicating with an external device through the first communication interface; and a second processor that runs a program stored in a second memory, the second processor executing a process related to communicating with the external device through the second communication interface;

wherein the information processing device has a first operating mode in which the first processor and the second processor operate according to a first clock signal that is supplied to the first processor and to the second processor;

wherein the information processing device has a second operating mode in which the first processor executes some functions of the second processor, the first processor operates according to the first clock signal, and the second processor operates according to a second clock signal that is supplied to the second processor, the second clock signal having an operating frequency lower than the first clock signal; and wherein the first processor executes some of the processes related to communication with the external device in the second operating mode.

2. The information processing device described in claim 1, wherein:

the second memory executes a refresh operation in the first operating mode, and operates in a self-refresh mode in the second operating mode.

3. The information processing device described in claim 1, wherein:

the second processor goes to a wait-for-interrupt state in the second operating mode.

4. The information processing device described in claim 1, wherein:

the information processing device has a third operating mode in which the first processor and the second processor operate according to the second clock signal.

5. The information processing device described in claim 1, wherein:

the information processing device has a fourth operating mode in which the first processor operates according to the second clock signal in a wait-for-interrupt state, and the second processor operates according to the second clock signal.

6. The information processing device described in claim 1, wherein:

the first executes a process related to controlling itself.

7. A printing device comprising:

a print unit that prints;

a first communication interface and a second communication interface, the first communication interface for communicating via a serial communication standard and the second communication interface for communicating via network communication;

a control unit including a first processor that runs a program related to control of the print unit and that communicates with an external device through the first communication interface, a second processor that runs a program related to control of the second communication interface and that executes a process related to communicating with the external device through the second communication interface, and first memory that stores the program related to control of the print unit; and second memory storing the program related to control of the second communication interface;

the control unit having a first operating mode in which the first processor and the second processor operate according to a first clock signal that is supplied to the first processor and to the second processor, and a second operating mode in which the first processor executes some functions of the second processor, the first processor operates according to the first clock signal, and the second processor operates according to a second clock signal that is supplied to the second processor, the second clock signal having an operating frequency lower than the first clock signal;

wherein the first processor executes some of the processes related to communication with the external device in the second operating mode.

8. The printing device described in claim 7, wherein:

the second memory executes a refresh operation in the first operating mode, and operates in a self-refresh mode in the second operating mode.

9. The printing device described in claim 7, wherein:

the second processor goes to a wait-for-interrupt state in the second operating mode.

10. The printing device described in claim 7, wherein:

the control unit has a third operating mode in which the first processor and the second processor operate according to the second clock signal.

11. The printing device described in claim 10, wherein:

when the data the second communication interface received in the third operating mode contains print control data, the first processor goes to the second operating mode and reports to the second processor, the second processor goes to the first operating mode based on the report from the first processor and executes a process to receive the print control data, and the first processor prints by the print unit based on the print control data received by the second processor.

12. The printing device described in claim 7, wherein:

the control unit has a fourth operating mode in which the first processor operates according to the second clock signal in a wait-for-interrupt state, and the second processor operates according to the second clock signal.

13. The printing device described in claim 7, wherein:

when data received by the second communication interface includes print control data in the second operating mode, the second processor goes to the first operating mode based on a report from the first processor and executes a process related to receiving the print control data, and the first processor controls the print unit to print based on the print control data received by the second processor.

14. A control method of an information processing device including a first communication interface for communicating via a serial communication standard, a second communication interface for communicating via network communication, a first processor that runs a program stored in a first memory, and a second processor that runs a program stored in a second memory, the method comprising:

communicating, by the first processor, with an external device through the first communication interface;

executing a process, by the second processor, related to communicating with the external device through the second communication interface;

when a specific condition is satisfied, changing from a first operating mode in which the first processor and the second processor operate according to a first clock signal that is supplied to the first processor and to the second processor,
- to a second operating mode in which the first processor executes some functions of the second processor, the first processor operates according to the first clock signal, and the second processor operates according to a second clock signal that is supplied to the second processor, the second clock signal having an operating frequency lower than the first clock signal;
- wherein the first processor executes some of the processes related to communication with the external device in the second operating mode.

15. The control method of an information processing device described in claim 14, wherein:
the second memory executes a refresh operation in the first operating mode, and
operates in a self-refresh mode in the second operating mode.

16. The control method of an information processing device described in claim 14, wherein:
the second processor goes to a wait-for-interrupt state in the second operating mode.

17. The control method of an information processing device described in claim 14, further comprising:
changing from the second operating mode to a third operating mode in which the first processor and the second processor operate according to the second clock signal when a specific condition is satisfied.

18. The control method of an information processing device described in claim 14, further comprising:
changing from the second operating mode to a fourth operating mode in which the first processor operates according to the second clock signal in a wait-for-interrupt state, and the second processor operates according to the second clock signal.

19. The control method of an information processing device described in claim 14, further comprising:
the first processor executing a process related to controlling printing.

* * * * *